(12) United States Patent
Rock et al.

(10) Patent No.: US 8,778,558 B2
(45) Date of Patent: Jul. 15, 2014

(54) METHODS FOR MAKING A THERMOFORMED SUBGASKET AND PRODUCTS THEREOF

(75) Inventors: Jeffrey A. Rock, Fairport, NY (US); Steven G. Goebel, Victor, NY (US); Glenn W. Skala, Churchville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 48 days.

(21) Appl. No.: 13/475,134

(22) Filed: May 18, 2012

(65) Prior Publication Data

US 2013/0309594 A1  Nov. 21, 2013

(51) Int. Cl.
*H01M 8/00* (2006.01)
*H01M 8/02* (2006.01)
*H01M 2/00* (2006.01)
*H01M 8/10* (2006.01)

(52) U.S. Cl.
CPC .............. *H01M 8/00* (2013.01); *H01M 8/0286* (2013.01); *H01M 8/0284* (2013.01); *H01M 8/0202* (2013.01); *Y02E 60/50* (2013.01); *H01M 2/00* (2013.01); *H01M 2008/1095* (2013.01)
USPC ............................ 429/482; 429/535; 429/508

(58) Field of Classification Search
None
See application file for complete search history.

(56) References Cited

U.S. PATENT DOCUMENTS

| | | | |
|---|---|---|---|
| 2007/0264556 A1* | 11/2007 | Andreas-Schott et al. | 429/35 |
| 2010/0035115 A1* | 2/2010 | Takagi et al. | 429/33 |
| 2010/0062320 A1 | 3/2010 | Dammar et al. | |
| 2011/0318667 A1 | 12/2011 | Miller et al. | |

* cited by examiner

*Primary Examiner* — Patrick Ryan
*Assistant Examiner* — Haixia Zhang
(74) *Attorney, Agent, or Firm* — Dinsmore & Shohl LLP

(57) ABSTRACT

Methods of making an integrated subgasket assembly, a unitized electrode assembly, an integrated fuel cell assembly, and products thereof. The methods include forming the subgasket by providing a base sheet having an initial thickness, stretching a first region of the base sheet a first distance, and forming an active area window in the base sheet.

7 Claims, 12 Drawing Sheets

METHODS FOR MAKING A THERMOFORMED SUBGASKET AND PRODUCTS THEREOF

TECHNICAL FIELD

This disclosure relates generally to fuel cells, and more particularly, to methods of thermoforming a subgasket for use in fuel cells.

BACKGROUND

Electrochemical conversion cells, referred to as fuel cells, produce electrical energy by processing first and second reactants, e.g., through oxidation and reduction of hydrogen and oxygen. By way of illustration and not limitation, an example polymer electrolyte fuel cell comprises a polymer membrane (e.g., a proton exchange membrane (PEM)) positioned between a pair of catalyst layers and a pair of gas diffusion media (GDM). The GDM can include a gas diffusion layer and a microporous layer (MPL). The cathode electrode layers can be part of the PEM (catalyst-coated membrane (CCM)) or as a layer on the GDM (catalyst coated diffusion media (CCDM)). This assembly is called a unitized electrode assembly (UEA). A cathode plate and an anode plate (or bipolar plates BPP) are positioned at the outermost sides adjacent the gas diffusion media layers and the preceding components are tightly compressed to form a single cell unit.

The UEA also includes a subgasket material which acts to separate the anode and cathode flow streams and provides for electrical insulation between the anode and cathode plates (or BPPs) of the fuel cell. It is desirable for the subgasket film material to extend to or slightly past the plate edges in order to act as an electrical insulator between the anode and cathode plates of a cell. A subgasket that follows a periphery of the anode and cathode plates abuts the MEA. An inner edge of the subgasket defines the active region of the MEA.

The dimensions of the subgasket may be important for providing adequate sealing between the BPPs of a fuel cell stack, and militating against adverse effects of electrolyte membrane expansion and electrolyte membrane shearing under compression of the UEA. A subgasket having a single thickness may affect the fuel cell performance, in that a tenting region may be formed between the diffusion media and the electrolyte membrane. The tenting region is a cavity formed between the electrolyte membrane and the diffusion media, adjacent a lap joint between the subgasket and the membrane. The tenting region is generally triangular cross-sectional shape.

When the subgasket has a single thickness that is too thick, it may be too rigid to optimize the life of the UEA. Expansion of the electrolyte membrane in the tenting region can cause the electrolyte membrane to buckle, and can cause damage to the electrolyte membrane. Additionally, repeated expansion and contraction of the electrolyte membrane may cause excessive wear of the electrolyte membrane along the edge of the subgasket when UEA over-compression is present. Minimization of a total cross sectional area of the tenting region may be desired to militate against excessive wear and premature failure of the electrolyte membrane and/or diffusion media.

To minimize the cross-sectional area of the tenting and/or thin a subgasket, a laser ablation process may be used. In a laser ablation process, the laser can sublimate an unfinished subgasket film to thin the subgasket in the desired areas, forming a finished subgasket. However, laser ablation processes can be quite costly. Alternatively, the unfinished subgasket film can be heated and pressed against a mold surface. However, this process fails to adequately thin a subgasket as there is limited volume for displacing the necessary material to thin a subgasket. Therefore, there is a desire to develop a process that can adequately thin a subgasket and is less costly.

When a subgasket is too thin, it may be mechanically weak and difficult to handle. The subgasket may be subjected to excessive deflection caused by a flow of gaseous reactants in the feed region where the diffusion media is not present. When excessively deflected, the subgasket may enter and restrict gaseous reactant communication to and from the active areas of the bipolar plate. In addition, when a UEA having a thin subgasket is assembled into a fuel cell stack as a discrete component, it can be difficult to obtain good positional alignment of the trimmed UEA profile features to the BPP features in the fuel cell stack assembly. Thus, there is a desire to reduce the thickness of the subgasket material to reduce costs and decrease membrane stress at the subgasket edge where the anode and cathode GDMs overlap the subgasket, while avoiding the issues associated with thin subgaskets.

The subgasket may also contain other components to form a subgasket assembly. Seals may be disposed on the subgasket to keep reactant gases (e.g., hydrogen and oxygen) within their respective regions thereby preventing them from escaping the fuel cell. Reinforcing feed shims may also be used to provide structural support for the subgasket over the channel features in the feed region of the plate. An insulator may also be added along the perimeter of the subgasket to further insulate and provide protection from short-circuiting between the BPPs. In assembling the subgasket assembly, it can be difficult to assemble each part (e.g., seal, shim, insulator, etc.) as each introduces thickness considerations and placement challenges. Thus, it may be desirable to keep the subgasket thin in the areas where the diffusion media overlaps it to minimize the tenting region area, and thick in the feed region area so that the subgasket is structurally sound and can avoid, for e.g., excessive deflection.

In view of the foregoing, it would be desirable to develop a subgasket, an integrated subgasket assembly, a UEA, and an integrated fuel cell assembly, along with methods of production thereof, in order to prolong the operating life of a UEA and fuel cell, while minimizing manufacturing costs.

SUMMARY

Disclosed herein are methods for thermoforming a subgasket. The methods comprise providing a base sheet having an initial thickness, stretching a first region of the base sheet a first distance, and forming an active area window in the base sheet.

Also disclosed herein are methods of forming an integrated subgasket assembly. The methods comprise providing an insulator; providing a shim; providing a thermoformed subgasket comprising an active area window; and assembling the insulator, shim, and thermoformed subgasket together to form an integrated subgasket assembly. The subgasket is formed by providing a base sheet having an initial thickness; stretching a first region of the base sheet a first distance; and forming an active area window in the base sheet.

Also disclosed herein are methods of making a unitized electrode assembly. The methods comprise providing a polymer membrane; providing an anode electrode and a cathode electrode on opposite sides of the polymer membrane; providing a thermoformed subgasket comprising an active area window; and positioning the thermoformed subgasket adjacent the polymer membrane. The thermoformed subgasket is formed by providing a base sheet having an initial thickness; stretching a first region of the base sheet a first distance; and forming an active area window in the base sheet.

Also disclosed herein are methods of making an integrated fuel cell assembly. The methods comprise providing a unitized electrode assembly comprising a thermoformed subgasket, providing a bipolar plate, and assembling the unitized electrode assembly and bipolar plate together to form an integrated fuel cell assembly. The thermoformed subgasket is formed by providing a base sheet having an initial thickness, stretching a first region of the base sheet a first distance, and forming an active area window in the base sheet.

BRIEF DESCRIPTION OF THE DRAWINGS

While the specification concludes with claims that particularly point out and distinctly claim the invention, it is believed the present invention will be better understood from the following description of certain examples taken in conjunction with the accompanying drawings. In the drawings, like numerals represent like elements throughout the several views, and various components of the drawings are not necessarily illustrated to scale.

Figure 1A:
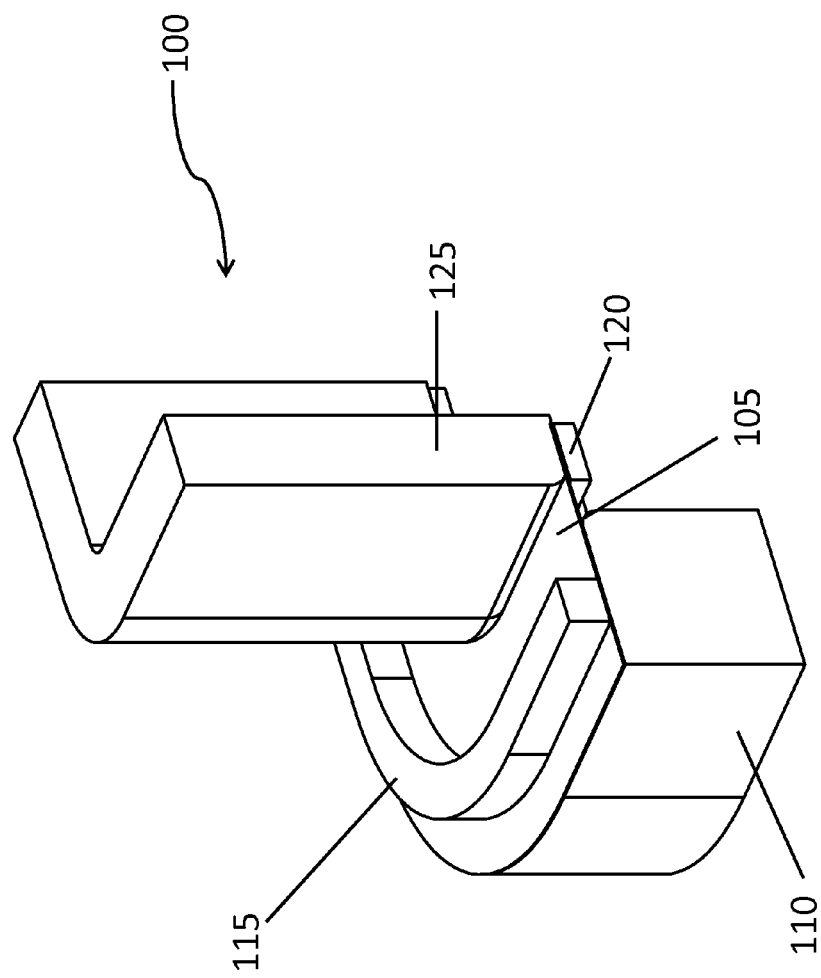
FIGS. 1A-1D depict a fragmented cross-sectional view of an exemplary method for thermoforming a subgasket according to one or more embodiments of the present invention.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention, it being understood, however, that this invention is not limited to the precise arrangements shown.

DETAILED DESCRIPTION

Features and benefits of the various embodiments of the present invention will become apparent from the following description and appended drawings, which include examples of specific embodiments intended to give a broad representation of the invention. Various modifications will be apparent to those skilled in the art from this description and from practice of the invention. The scope is not intended to be limited to the particular forms disclosed and the invention covers all modifications, equivalents and alternatives falling within the spirit and scope of the invention as defined by the claims.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Referring to FIG. 1A, an exemplary method (100) of thermoforming a subgasket is depicted. A base sheet (105) from which the subgasket will be formed may be introduced into a thermoforming apparatus. The base sheet (105) is positioned between and contacted with a lower die (110) and a primary hold down tool (115). The base sheet (105) is also depicted positioned between and contacted with a pressure pad (120) and an upper die (125). However, the pressure pad (120) is optionally a component that may or may not be used. The lower die (110), primary hold down tool (115), pressure pad (120) and upper die (125) are shaped to form an active area window as will be shown further in FIG. 3. Of course, other suitable shapes for these tools will be apparent to those of ordinary skill in the art in view of the teachings herein.

The base sheet can comprise any polymer film that meets fuel cell requirements (e.g., having appropriate mechanical properties based on operating temperatures, pressures, and thicknesses, being an electrical insulator or have surfaces that are electrically nonconductive, and desirably being inexpensive and easily manufacturable). Suitable materials include, but are not limited to, polypropylene, polyethylene terephthalate (PET), polyethylene naphthalate (PEN), polyimide (PI), polyetheretherketone (PEEK), and combinations thereof. It is further understood that the subgasket can be a single layer sheet or film, or it can be a multi-layer sheet, film, or foam, including for e.g., a closed cell foam.

The base sheet has an initial thickness. The initial thickness may range from about 2 mils to about 20 mils. In some examples, the initial thickness may range from about 2 mils to about 15 mils. In further examples, the initial thickness may range from about 4 mils to about 10 mils. Other thicknesses can be used and will be apparent to those of ordinary skill in the art in view of the teachings herein.

The lower die (110) and upper die (125) may comprise a syntactic foam core, which can include a variety of polymeric materials that have been lightened by the inclusion of hollow spheres. In some examples, the foam may be coated with a thin film comprising polytetrafluoroethylene, polypropylene, polyetheretherketone, polyphenylene sulfide, polyetherimide, polyamideimide, polyethersulfone, polyimide, silicone, polycarbonate, and combinations thereof. In other examples, the foam core may be a blend of syntactic foam with a polymeric material. The polymeric material may include polytetrafluoroethylene, polypropylene, polyetheretherketone, polyphenylene sulfide, polyetherimide, polyamideimide, polyethersulfone, polyimide, silicone, polycarbonate, and combinations thereof. In some examples, the lower die and upper die comprise a syntactic foam core coated with polytetrafluoroethylene.

The pressure pad (120) and primary hold down tool (115) may comprise aluminum, steel, or other suitable materials. In some examples, the pressure pad and primary hold down tool comprise aluminum.

Figure 1B:
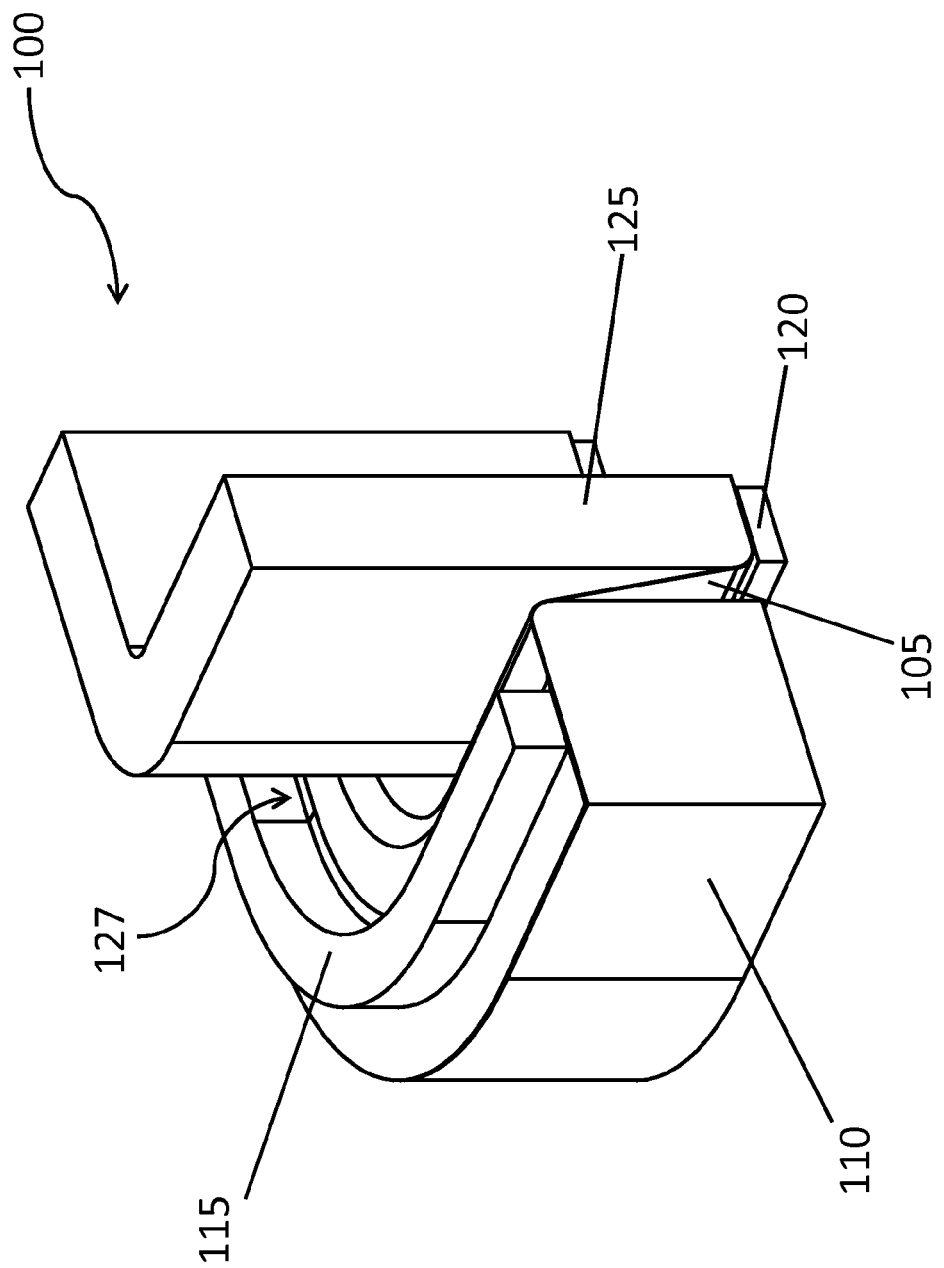

Referring to FIG. 1B, the upper die (125) and pressure pad (120) stretch a first region (127) of the base sheet (105) a first distance. The first region (127) of the base sheet (105) is the region between the primary hold down tool (115) and the upper die (125). The upper die (125) and pressure pad (120) move a first distance in a direction perpendicular to a plane of the base sheet to elongate the base sheet (105) by stretching it around a corner of the lower die (110). In some examples, the first distance may range from about 5 mm to about 35 mm. In other examples, the first distance may range from about 10 mm to about 25 mm. In further examples, the first distance may range from about 15 mm to about 20 mm. The stretching of the base sheet a first distance will cause it to thin without breakage or tears. The first region of the base sheet is stretched to a primary thickness that is less than the initial thickness of the base sheet. In some examples, the first region of the base sheet will thin to a primary thickness of at least about 2 mils. In other examples, the first region of the base sheet will thin to a primary thickness of at least about 4 mils. In other examples, the first region of the base sheet will thin to a primary thickness of at least about 8 mils. In further examples, the first region of the base sheet will thin to a primary thickness of from about 2 mils to about 15 mils.

Figure 1C:
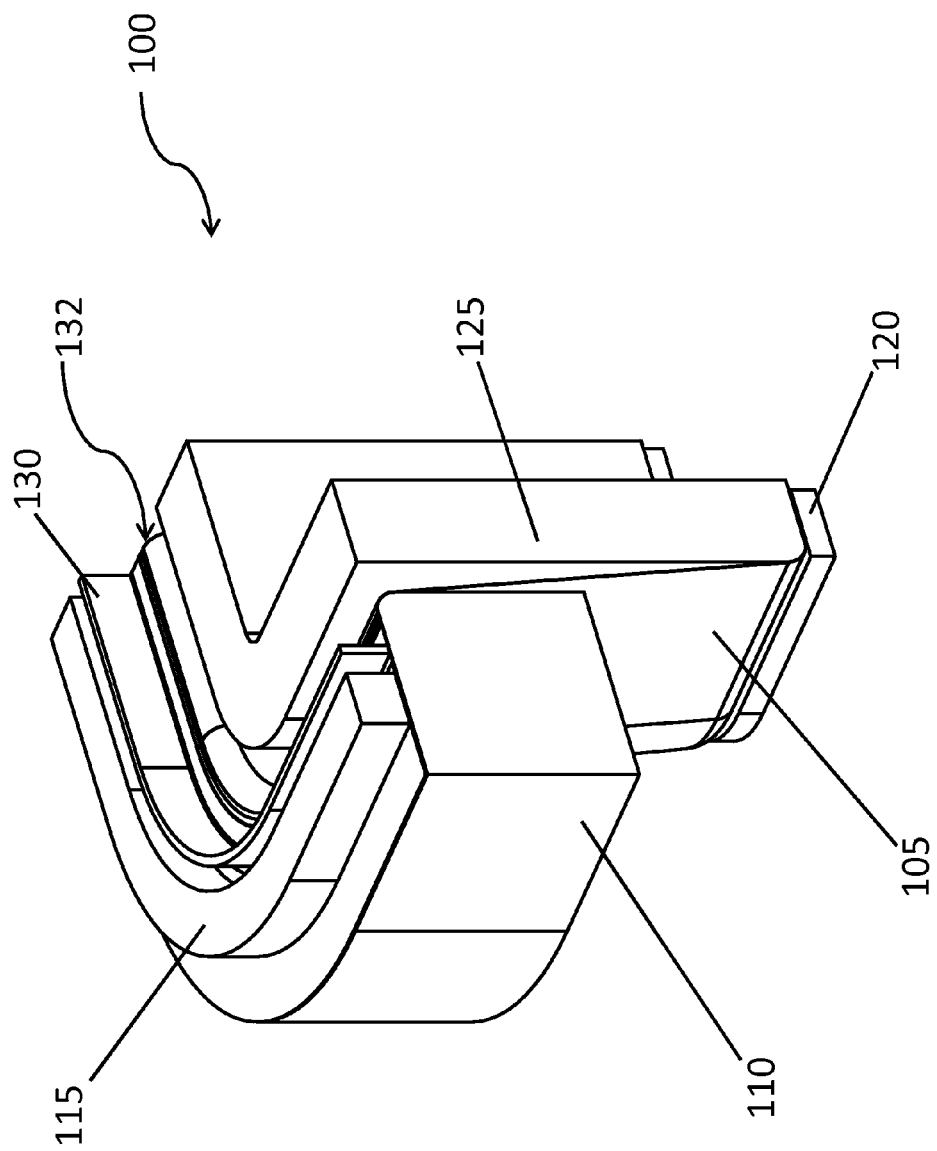

Referring to FIG. 1C, a secondary hold down tool (130) is shown coming into contact with the base sheet (105) as the upper die (125) and pressure pad (120). The secondary hold down tool (130) may comprise aluminum, steel, or other suitable materials. In some examples, the secondary hold down tool comprises aluminum. The upper die (125) and pressure pad (120) then stretch a second region (132) of the base sheet (105) a second distance. The second region (132) of the base sheet (105) is the region between the secondary hold down tool (130) and the upper die (125). The upper die (125) and pressure pad (120) move a second distance in a direction perpendicular to a plane of the base sheet (105) to elongate the base sheet (105) by stretching it around a corner of the lower die (110). The second stretching step is a continuation of the first stretching step with the upper die (125) and pressure pad (120) continuing to move in the same direction.

The first distance is greater than the second distance. In some examples, the second distance may range from an additional about 5 mm to about 30 mm. In other examples, the second distance may range from about 5 mm to about 20 mm. In further examples, the second distance may range from about 5 mm to about 10 mm. The stretching of the base sheet a second distance will cause it to thin, such that the base sheet is further thinned without breakage or tears. The base sheet is stretched to a secondary thickness that is less than the primary thickness. In some examples, the second region of the base sheet will thin to a secondary thickness of at least about 1 mil. In other examples, the second region of the base sheet will thin to a secondary thickness of from about 1 mil to about 10 mils. In further examples, the second region of the base sheet will thin to a secondary thickness of from about 1 mil to about 5 mils.

Figure 1D:
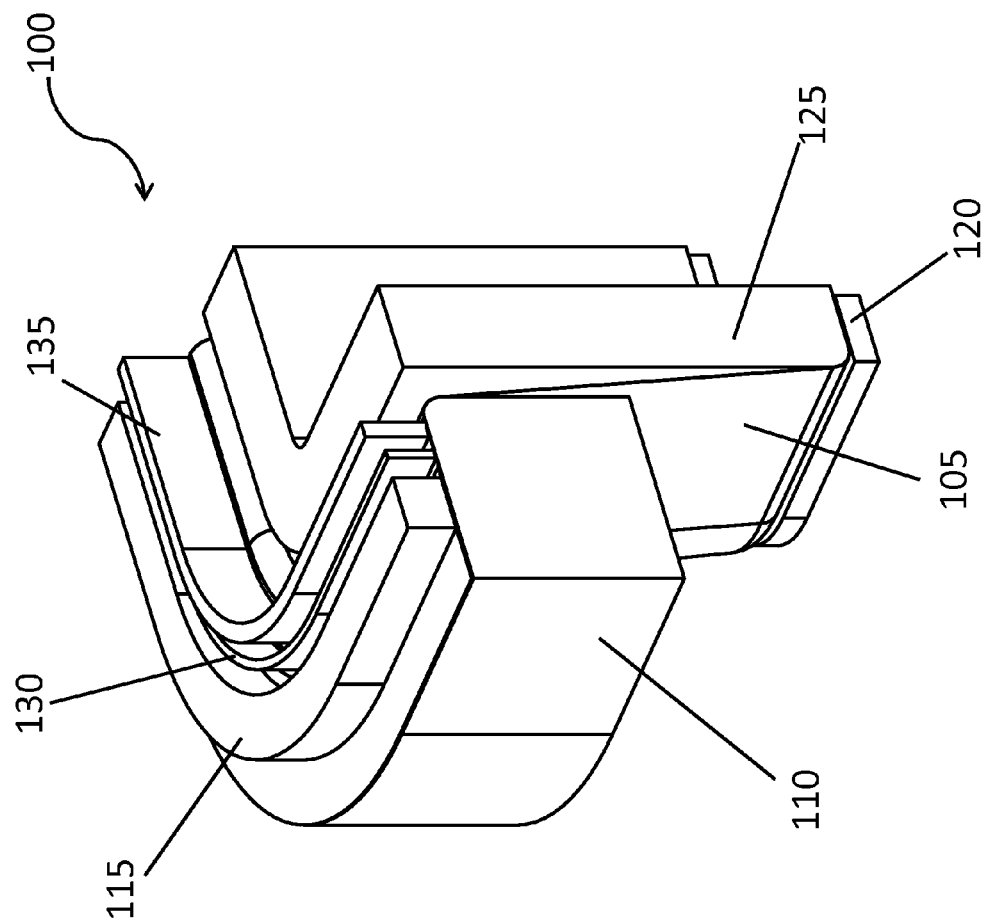

Referring to FIG. 1D, a form cut tool (135) contacts the base sheet (105) when the upper die (125) and pressure pad (120) at the end of the second distance. The form cut tool (135) is depicted as having an inclined face, which can be seen in FIG. 2, and may comprise steel, aluminum, or other suitable materials. In some examples, the form cut tool comprises steel. Of course, other suitable shapes of the form cut tool will be apparent to one of ordinary skill in the art in view of the teachings herein. In some examples, the form cut tool contacts the base sheet and cuts an inside edge of the active area window. In other examples, the form cut tool (135) contacts the base sheet and displaces a portion of the material on the base sheet, thereby forming a tapered edge. The form cut tool (135) then cuts an inside edge of the active area window in the base sheet after formation of the tapered edge. The form cut tool (135) may also cut alignment features, which can be seen in FIG. 3 and is further described below.

Figure 2A:
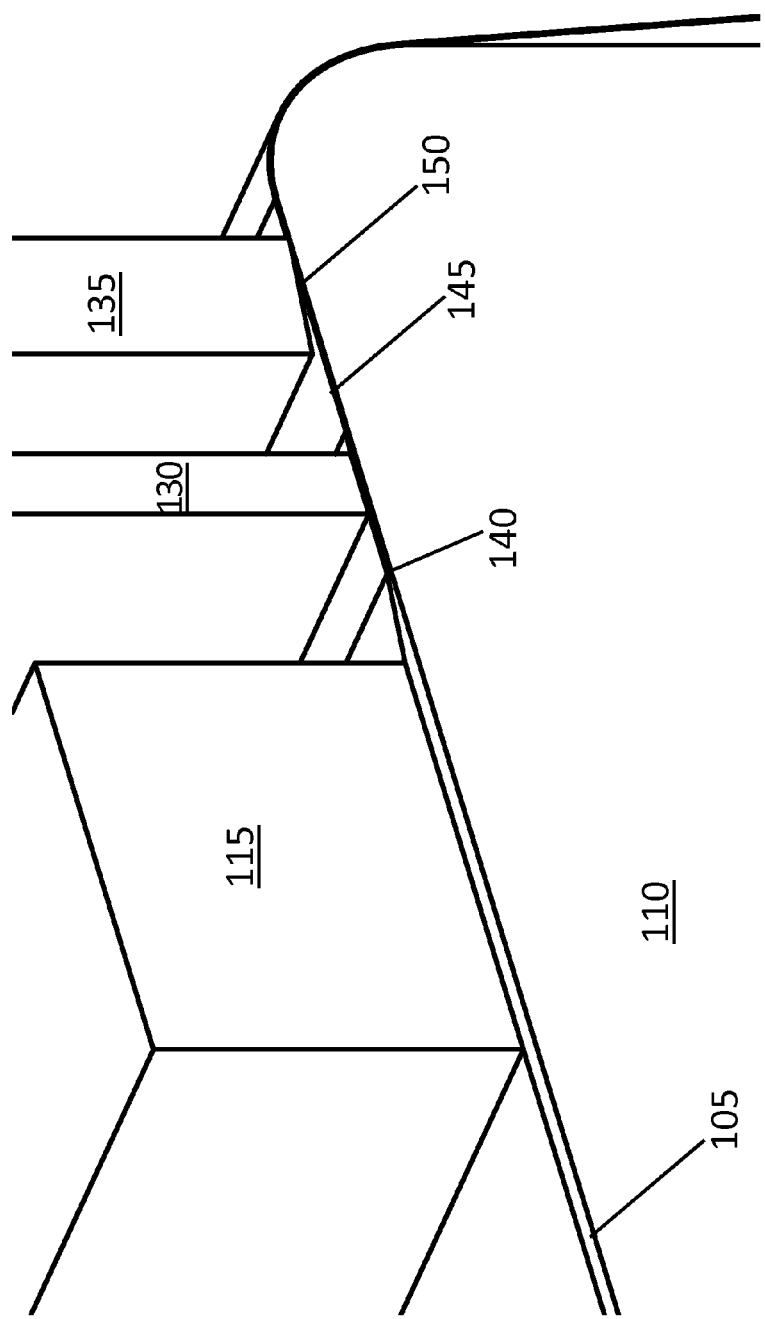
FIG. 2A depicts a detail view of the method step shown in FIG. 1D.
Figure 2B:
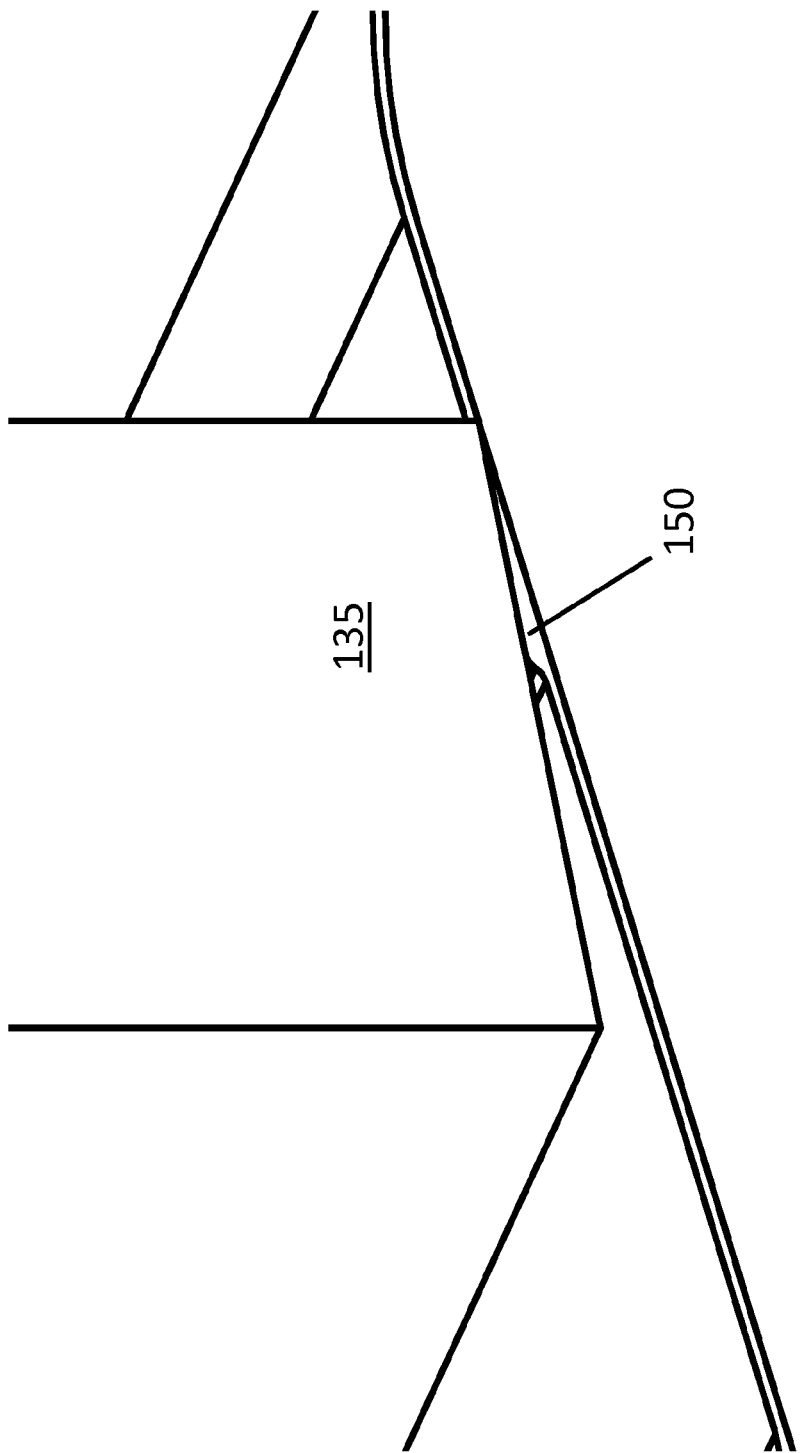
FIG. 2B depicts a detail view of the tapered edge shown in FIG. 2A.

Referring to FIG. 2A, a detailed view of a portion of FIG. 1D is depicted. The base sheet (105) is shown in contact with and positioned between the lower die (110) and the primary hold down tool (115), the lower die (110) and the secondary hold down tool (130), and the lower die (110) and the form cut tool (135). When the inclined face of the form cut tool (135) contacts the base sheet (105), a tapered edge (150) is formed, which can be further seen in FIG. 2B, and the base sheet (105) is then cut. A first stretched region (140) is shown located between the primary hold down tool (115) and the secondary hold down tool (130). In the first stretched region (140), the base sheet (105) has a primary thickness that is less than the initial thickness of the base sheet (105). In some examples, the primary thickness of the first stretched region of the base sheet will be at least about 1 mil less than the initial thickness of the base sheet. In other examples, the primary thickness of the first stretched region of the base sheet will be at least about 3 mils less than the initial thickness of the base sheet. In further examples, the primary thickness of the first stretched region of the base sheet will be at least about 5 mils less than the initial thickness of the base sheet. In some examples, the primary thickness of the first stretched region of the base sheet will be no more than about 6 mils less than the initial thickness of the base sheet. In other examples, the primary thickness of the first stretched region of the base sheet will be no more than about 8 mils less than the initial thickness of the base sheet. In further examples, the primary thickness of the first stretched region of the base sheet will be no more than about 10 mils less than the initial thickness of the base sheet.

A second stretched region (145) is shown located between the secondary hold down tool (130) and the form cut tool (135). In the second stretched region (145), the secondary thickness of the base sheet (105) has a thickness that is less than the primary thickness of the first stretched region of the base sheet (105). In some examples, the secondary thickness of the second stretched region of the base sheet will be at least about 0.1 mil less than the primary thickness of the first stretched region of the base sheet. In other examples, the secondary thickness of the second stretched region of the base sheet will be at least about 0.5 mil less than the primary thickness of the first stretched region of the base sheet. In further examples, the secondary thickness of the second stretched region of the base sheet will be at least about 1 mil less than the primary thickness of the first stretched region of the base sheet. In some examples, the secondary thickness of the second stretched region of the base sheet will be no more than about 3 mils less than the primary thickness of the first stretched region of the base sheet. In other examples, the secondary thickness of the second stretched region of the base sheet will be no more than about 2 mils less than the primary thickness of the first stretched region of the base sheet. In further examples, the secondary thickness of the second stretched region of the base sheet will be no more than about 1.5 mils less than the primary thickness of the first stretched region of the base sheet.

In some examples, the method comprises heating the base sheet. The base sheet may be heated prior to stretching and formation of an active area window, and is heated to a temperature sufficient to allow thermoforming of the sheet. In some examples, the base sheet is heated until it softens or starts to sag. In some examples, the sheet temperature is less than or equal to about 190° C. In other examples, the sheet temperature is less than or equal to about 180° C. In further examples, the sheet temperature is less than or equal to about 175° C. Further, the sheet temperature may be greater than or equal to about 125° C. in some examples. In other examples, the sheet temperature may be greater than or equal to about 150° C. Of course, other suitable temperatures for softening a base sheet will apparent to those of ordinary skill in the art in view of the teachings herein.

Figure 3:
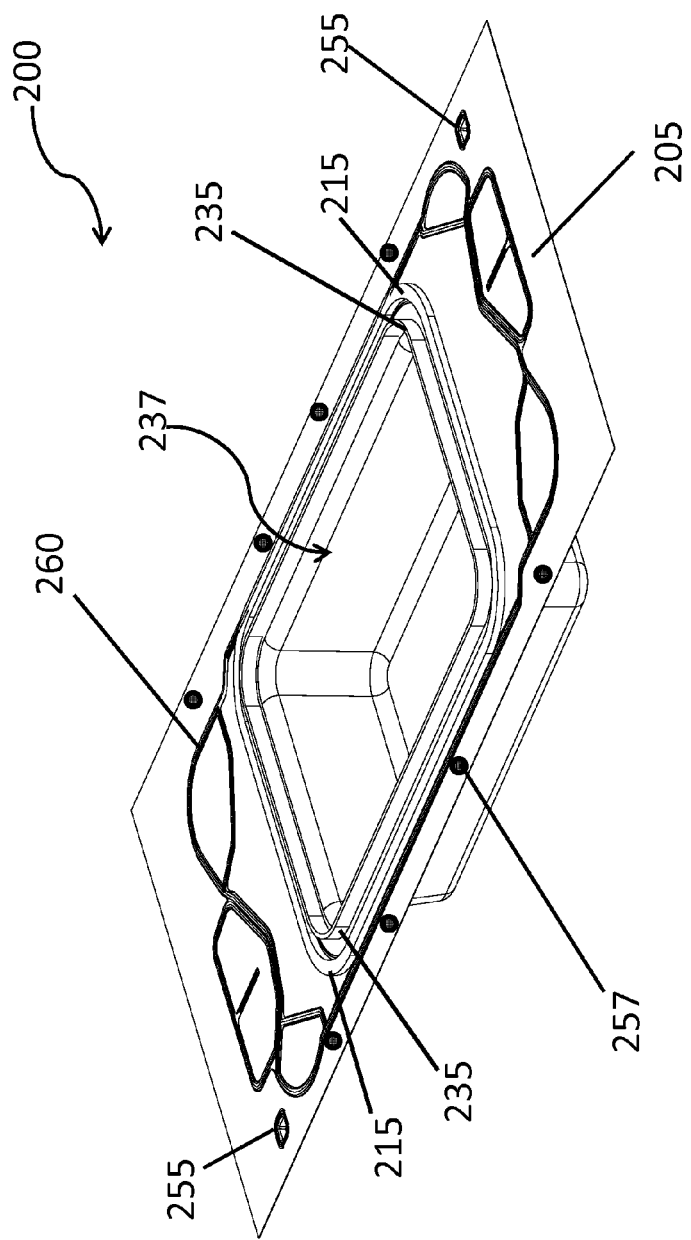
FIG. 3 depicts a perspective view of an exemplary method for thermoforming a subgasket according to one or more embodiments of the present invention.

Referring to FIG. 3, depicted is a perspective view of an exemplary method (200) of thermoforming a subgasket. A base sheet (205) is shown in contact with a primary hold down tool (215) and a form cut tool (235). The base sheet (205) is also in contact with a lower die (not pictured) and an upper die (not pictured). The base sheet (205) is shown as it is being formed. The base sheet (205) having an initial thickness is provided, and the base sheet (205) is stretched a first distance. In some examples, a form cut tool (235) contacts the base sheet (205) and cuts an inside edge of the active area window. In other examples, a form cut tool (235) contacts the base sheet (205), displaces a portion of the material on the base sheet, thereby forming a tapered edge. The portion of the base sheet (205) within the active area region (i.e., interior area) (237) of the form cut tool (235) perimeter is cut and removed to form the active area window.

Also depicted in FIG. 3 are alignment features (255), transfer holes (257), and seal bead regions (260), which may be formed in the base sheet (205). Alignment features (255) are generally formed in the perimeter of the base sheet (205), and are shown below located in the corners of the base sheet (205). Alignment features (255) may be used to assist in aligning the subgasket with the BPPs (discussed below). The alignment features may be through holes, formed pockets, or other mechanisms that may be used to align parts. Transfer holes (257) are located along the edge of base sheet (205), and may be used to move the base sheet (205) through different operational steps. Transfer holes (257) may be trimmed from the finished subgasket. The alignment features and transfer holes may be formed in a single step. Alternatively, they may be formed in separate steps.

One or more seal bead regions may be formed in the base sheet (205) by vacuuming forming or pressure forming. The one or more seal bead regions may be shaped to follow the contour of the BPPs. Of course, other types of seals may be used that are known to those of skill in the art. For example, in some examples a thermally activated adhesive could be applied to a BPP or to the subgasket after the forming operation. Similarly, a pressure sensitive adhesive (PSA) could also be applied to either the BPP or subgasket after the forming operation. The PSA would avoid the need to introduce heat necessary to activate the thermally activated adhesive. In other examples, a thin coating of elastomer could be applied to the BPP or to the subgasket to seal one side of the subgasket to the plate, while using other methods to maintain positioning between the two. The other side of the subgasket could be sealed to the next BPP using a conventional compressed elastomer seal. In further examples, an elastomer may be liquid injection molded to both sides of a subgasket.

Figure 4:
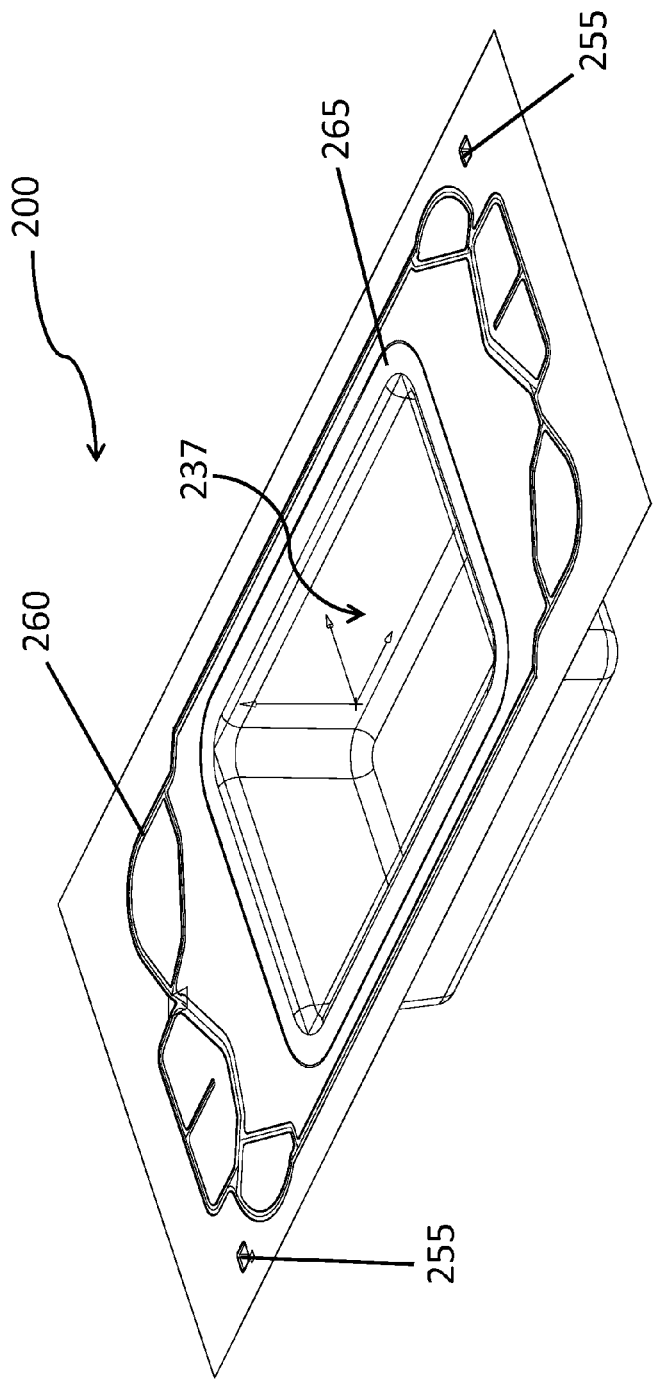
FIG. 4 is depicts a perspective view of the method step shown in FIG. 3 without thermoforming tools.

FIG. 4 depicts a perspective view of the base sheet (205) depicted in FIG. 3, but without any tooling shown. The base sheet (205) is shown with alignment features (255), transfer holes (257), and seal bead regions (260) formed therein. The base sheet (205) also depicts an active area window perimeter (265), with the active area region (237), which is the interior area of active area window perimeter (265) to be cut and removed, thereby forming an active area window.

Figure 5:
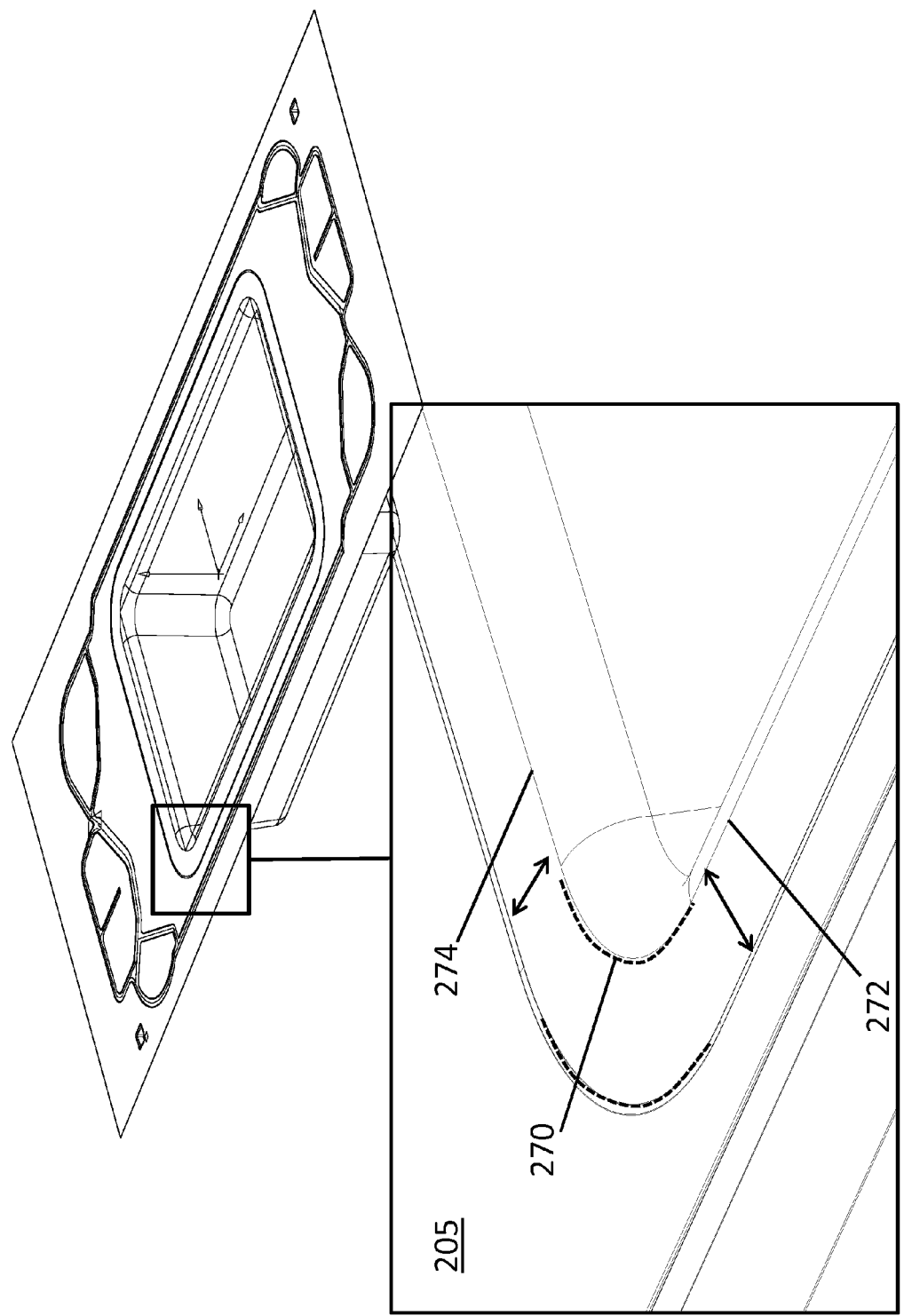
FIG. 5 depicts a detail view of a corner edge of a subgasket depicted in FIG. 4.

FIG. 5 depicts a detail view of a corner edge of the base sheet (205). A corner edge of the primary hold down tool, secondary hold down tool (if present), and the form cut tool must be sized to minimize any deformation (e.g. wrinkling or buckling) that can result from stretching the base sheet (205). When the long edge (272) and short edge (274) regions of the base sheet (205) are stretched, it is believed that a sharp corner may see compressive stresses that could lead to deformation of the base sheet in those areas, and less than desired thinning in those areas. It has been found that to avoid such issues, the radius of curvature at the inside corner edge (270) should be large enough so that the relative change in arc length, $$\frac{(\text{outer arc length} - \text{inner arc length})}{\text{outer arc length}},$$

is less than about 0.3. In other examples, the relative change in arc length is less than about 0.25.

Figure 6:
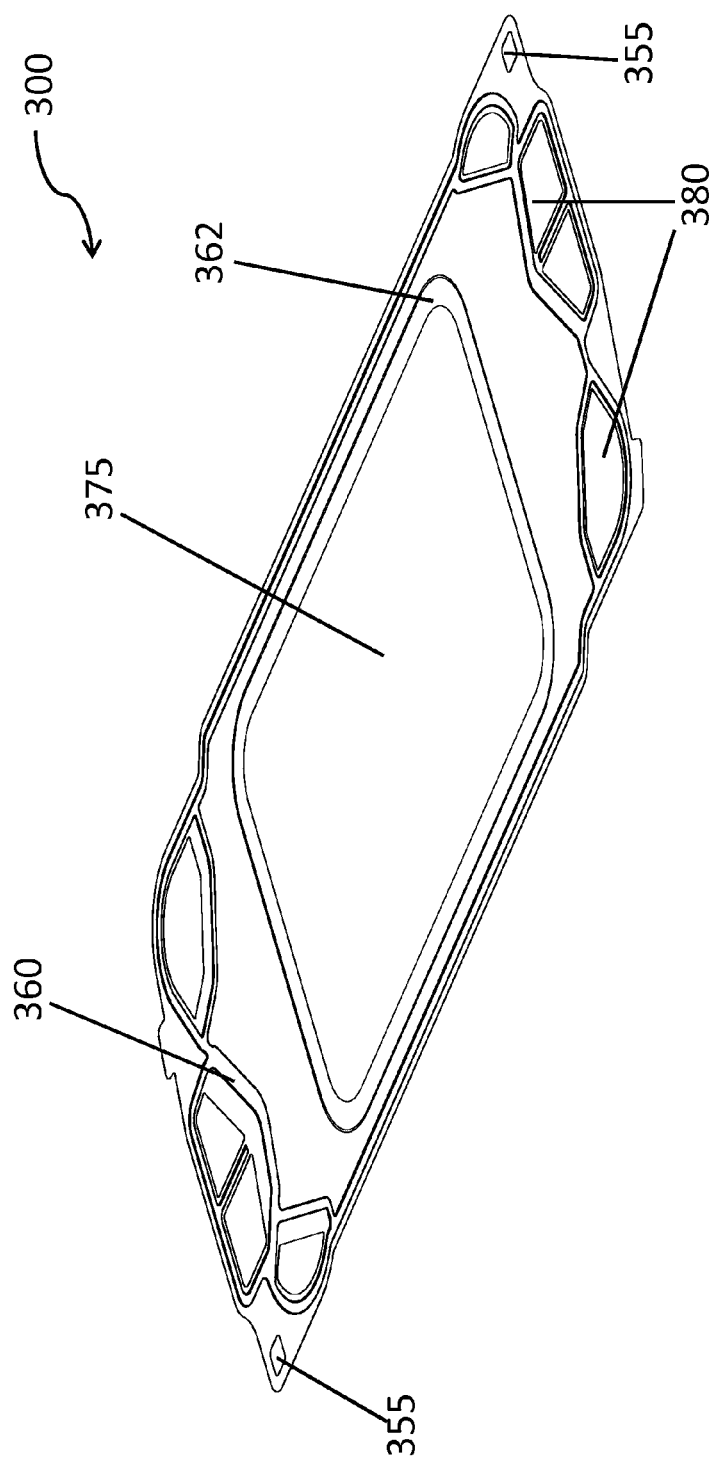
FIG. 6 depicts a perspective view of a thermoformed subgasket according to one or more embodiments of the present invention.

FIG. 6 depicts a subgasket (300) comprising seal regions (360), alignment features (355), an active area window (375) having a tapered edge (362), and apertures (380) for the cathode supply and exhaust, anode supply and exhaust, and coolant supply and exhaust. In some examples, the active area window (375) may not comprise a tapered edge. The active area window (375) is an opening in a central portion of the subgasket (300). The active area window (375) exposes the active area of the membrane electrode assembly, with the active area being the area of a fuel cell electrode that is electrochemically active and able to produce electricity from the supplied fuel. The active area window (375) and apertures (380) may generally correspond to the window and apertures formed in the bipolar plate and the UEA. It is to be understood that the shape and/or configuration of the various apertures are for illustration purposes, and other shapes and/or configurations may be used. The subgasket (300) is depicted with the outer edges having been trimmed. In general, the outer edge of the subgasket (300) may be trimmed and shaped to correspond with the BPP, an example of which can be seen in FIG. 7. In some examples, portions of the subgasket (300), for e.g., the outer edges and apertures (380), may be trimmed and removed prior to integration into the UEA. In other examples, portions of the subgasket (300) may be trimmed and removed after the subgasket (300) has been integrated into the UEA. In further examples, portions of the subgasket (300) may be trimmed and removed after the subgasket (300) has been assembled into an integrated fuel cell assembly. For example, the apertures (380) of the subgasket (300) may be formed using the BPP as a guide.

Figure 7:
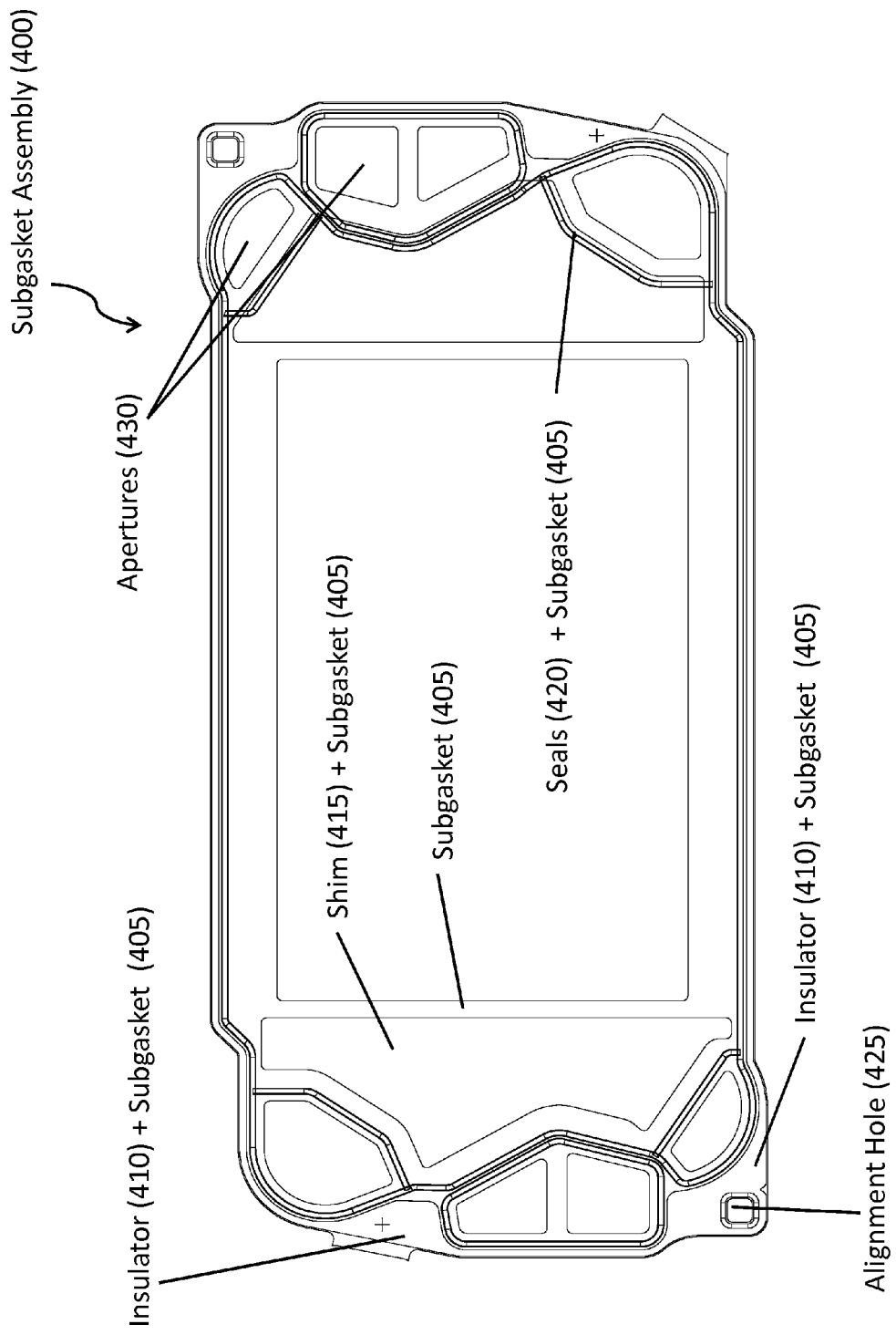
FIG. 7 depicts a top view of a integrated subgasket assembly according to one or more embodiments of the present invention.

FIG. 7 depicts an integrated subgasket assembly (400). The integrated subgasket assembly (400) comprises a subgasket (405), insulator (410), one or more shims (415) placed in the feed region, and seals (420). FIG. 7 illustrates that a three-component assembly comprising the subgasket, shims, and insulator can be replaced with a single component. The thickness of the material can be matched to the differing requirements of the cell, allowing for cost reduction. In addition, new features can be added to address water management and plate edge protection, if desired. The subgasket (405) can optionally include one or more alignment features (425), which will locate the UEA relative to alignment features of the BPP. Other types of alignment features as are known in the art can also be used. There can also be apertures (430) for various plate features, e.g., cathode supply and exhaust, anode supply and exhaust, and coolant supply and exhaust.

The integrated subgasket assembly may be formed by providing an insulator, providing a shim, providing a thermoformed subgasket comprising an active area window, and assembling the insulator, shims, and thermoformed subgasket together to form an integrated subgasket assembly. The active area window may further have a tapered edge. The thermoformed subgasket may be formed by providing a base sheet having an initial thickness, stretching a first region of the base sheet a first distance and forming an active area window in the base sheet. The method may further comprise stretching a second region of the base sheet a second distance. In forming the active area window, a tapered edge may also be formed therein. The method may also comprise providing one or more seals as disclosed herein.

The insulator, shim, and thermoformed subgasket may be assembled by applying an adhesive to at least one of the insulator, shims or thermoformed subgasket and affixing by, for e.g., hot pressing or laminating the insulator, shims and thermoformed subgasket together with the adhesive to form the integrated subgasket assembly. The adhesive may be a pressure sensitive adhesive or a thermally activated adhesive. Examples of suitable thermally activated adhesives that may be used herein include ethylene vinyl acetate, ethylene acrylic acid, polyamide, polyesters, polyolefins, polyurethanes, and combinations thereof. In some examples, the integrated subgasket assembly is assembled in order of thickness. The shims may be affixed first on the substrate using the adhesive. The shims can be the same size or different from each other depending on the design of the feed region. The shims can also be about the same size as the feed region or not. The feed shims may be made of PEN, although other suitable materials could also be used. Next, the insulator may be affixed around a perimeter of the subgasket using an adhesive.

Figure 8:
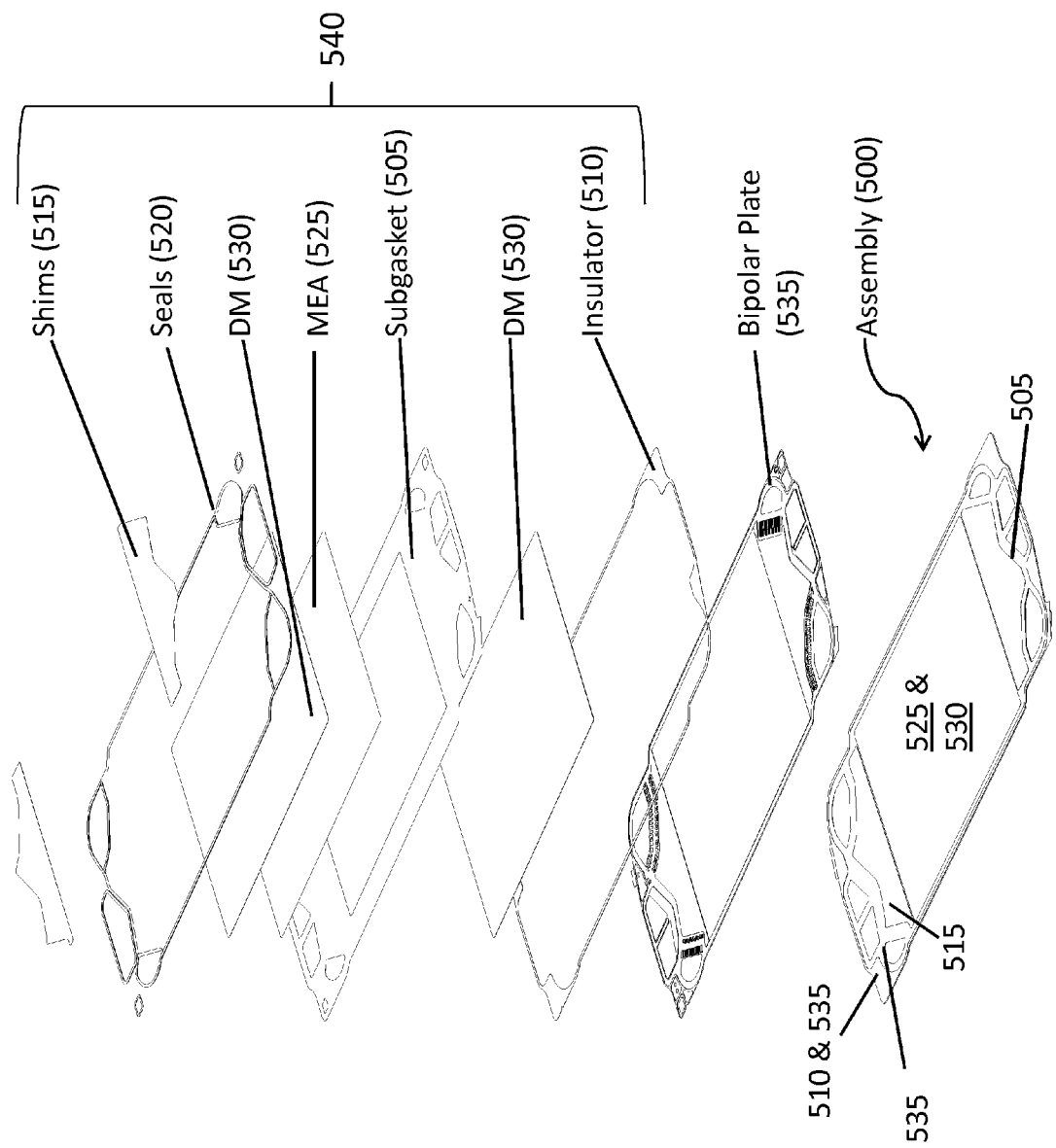
FIG. 8 depicts an exploded side view of an integrated fuel cell assembly according to one or more embodiments of the present invention.

FIG. 8 depicts an exploded view of an integrated fuel cell assembly (500) comprising a polymer membrane (525); a pair of gas diffusion media (530) on opposite sides of the polymer membrane (525), a subgasket (505) comprising an active area window; insulator (510) is depicted with seals (520) and shims (515); and a bipolar plate (535). The polymer membrane (525); gas diffusion media (530), a subgasket (505); insulator (510), seals (520) and shims (515), together form a UEA (540).

The UEA (540) and BPP (535) may further comprise alignment features (545) that can be used to align the UEA (540) with the BPP (535). Alignment holes, pins or other similar alignment mechanisms (not shown) may be used. The UEA (540) and BPP (535) are affixed together by any conventional process in the art (e.g., hot pressing, laminating, etc.) to form an integrated fuel cell assembly (500). The UEA (540) is bonded to the cathode plate of the BPP (535) by an adhesive. The adhesive forms a gas tight seal between the UEA (540), the subgasket (505) and the BPP (535). The adhesive maintains the UEA (540) and BPP (535) in proper alignment during further processing, which can include, for example, adding header cutouts (e.g., apertures) through the subgasket, trimming the subgasket to final size, and assembling the fuel cell stack.

In some examples, a heated plate is compressed against the UEA (540) to activate the adhesive, and bond the UEA (540) to the BPP (535). The bond forms a gas tight seal. Once the UEA (540) is attached to the BPP (535), in some examples, the subgasket (505) may be trimmed relative to the BPP features (independently of where the UEA is positioned relative to the BPP features) for proper overhang. The subgasket (505) may act as an electrical insulator between the BPPs.

The polymer membrane (525) may have an anode electrode and a cathode electrode formed on opposite sides of the polymer membrane (525). Thus, the anode electrode and the cathode electrode may be positioned between the polymer membrane (525) and the pair of gas diffusion media (530). Alternatively, the cathode and/or anode may be formed on the gas diffusion media (530) to form a catalyzed gas diffusion media. The gas diffusion media (530) may also comprise a microporous layer and a gas diffusion layer. The subgasket (505) may be positioned around a perimeter of one of the gas diffusion media (530). The subgasket (505) is positioned adjacent to either the polymer membrane (525), cathode electrode or anode electrode. The active area window of the subgasket (505) is arranged so that a center region of the polymer membrane (525), cathode electrode, or anode electrode is exposed by the active area window. The BPP (535) may comprise a cathode plate and an anode plate.

By preassembling the cell components prior to assembling the cell stack, the number of components to be assembled during stack assembly is decreased by half. This reduces the number of components that must be handled and tracked during the stack assembly process, and consequently, the stack assembly time. The preassembled integrated fuel cell assembly also allows for alternate cell stacking methods that may not be employed if the UEA and BPP are treated as separate components.

In addition, it is easier to control the alignment of the UEA and BPP while bonding them together to form the integrated fuel cell assembly than to control the alignment of each separate UEA and BPP in a stack of 200-300 cells. The bonding also prevents any shifting of the cell components relative to each other prior to applying the compressive load used to hold the stack together. The integrated fuel cell assembly may also allow the header features (e.g., apertures) to be cut through the subgasket material after positioning and joining to the BPP. This reduces the amount of subgasket material overhanging the plate edge needed to insulate and prevent plate to plate shorting. It also increases the cross-sectional area available for reactant and coolant flows through the subgasket header (e.g., aperture) openings. Attaching the thin, weak subgasket material of the UEA to the rigid BPP creates a subassembly that can be readily handled and aligned as the stack is assembled without worrying about damaging the subgasket material.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of forming an integrated subgasket assembly comprising:

providing an insulator;
providing a shim;
providing a thermoformed subgasket comprising an active area window, wherein the subgasket is formed by:
provi ding a base sheet having an initial thickness;
stretching a first region of the base sheet a first distance; and
forming an active area window in the base sheet; and
assembling the insulator, shim, and thermoformed subgasket together to form an integrated subgasket assembly.

2. The method of claim 1, wherein the subgasket is further formed by stretching a second region of the base sheet a second distance.

3. The method of claim 1, wherein forming the active area window comprises:
contacting the base sheet with a form cut tool; and
cutting an inside edge of the active area window.

4. The method of claim 1, wherein forming an active area window comprises:
contacting the base sheet with a form cut tool;
displacing a portion of the base sheet material to form a tapered edge; and
cutting an inside edge of the active area window.

5. The method of claim 1, wherein assembling comprises:
applying an adhesive to at least one of the insulator, shim or thermoformed subgasket; and
affixing the insulator, shim and thermoformed subgasket together with the adhesive to form the integrated subgasket assembly.

6. The method of claim 5, wherein affixing comprises hot pressing, laminating, and combinations of hot pressing and laminating.

7. An integrated subgasket assembly produced in accordance with the method of claim 1.

* * * * *